No. 628,564. Patented July 11, 1899.
C. TRAXLER.
CORRUGATING MACHINE.
(Application filed May 11, 1899.)

(No Model.)

Witnesses,
J. R. McQuigg
George B. Riley

Inventor,
Charles Traxler,
by Luther G. Hopper,
Attorney.

UNITED STATES PATENT OFFICE.

CHARLES TRAXLER, OF AKRON, OHIO, ASSIGNOR TO THE AMERICAN HARD RUBBER COMPANY, OF NEW YORK, N. Y.

CORRUGATING-MACHINE.

SPECIFICATION forming part of Letters Patent No. 628,564, dated July 11, 1899.

Application filed May 11, 1899. Serial No. 716,405. (No model.)

*To all whom it may concern:*

Be it known that I, CHARLES TRAXLER, a citizen of the United States, residing at Akron, in the county of Summit and State of Ohio, have invented certain new and useful Improvements in Corrugating-Machines, of which the following is a specification, the principle of the invention being herein explained and one mechanical form embodying the invention set forth, so as to distinguish it from other inventions.

My invention relates to machines which are employed for corrugating or crimping sheets of metal, hard rubber, or any material which can be made capable of being bent and receiving a durable set. Its objects are to provide a machine which may be operated either by hand or other power and which, beginning at one end of a sheet, will quickly and easily make the convolutions consecutively, holding the corrugated portion of the sheet firmly in place, while permitting the remaining portion to be taken up as fast as it is bent, thus obviating the danger of either fracturing or stretching the sheet, as between the ordinary form of grooved dies, through its inability to take up, and also preventing the tendency of the corrugated sheet to curl, as it does when passed between grooved rolls or between a flat and a rolling die. I attain these objects by the mechanism illustrated in the accompanying drawings, in which—

Figure 1:
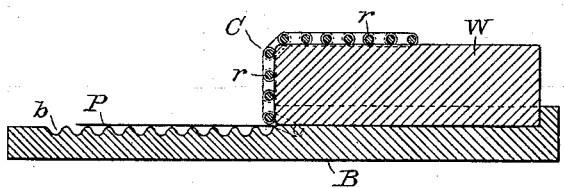
Figure 2:
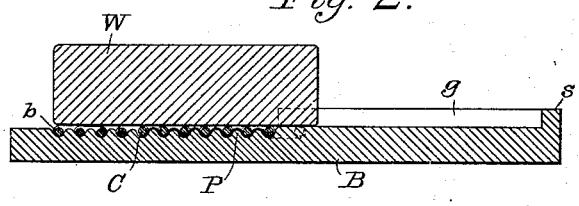
Figure 3:
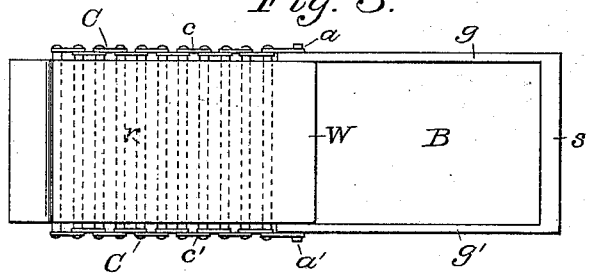
Figure 5:
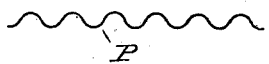
Figure 4:
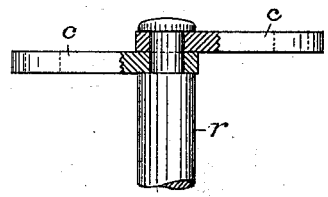

Figure 1 is a sectional elevation of the machine. Fig. 2 is a sectional elevation showing the relative position of the parts of the machine when the sheet has been corrugated. Fig. 3 is a plan view of Fig. 2. Fig. 4 is a detail, partly in section, of a joint between a crimping-rod and its links. Fig. 5 is an edge view of a corrugated sheet.

The reference-letter B indicates a base-plate which is provided with properly-shaped grooves $b$ to fit the corrugations to be made in the sheet. Hinged to the base at $a$ and $a'$ is a flexible corrugating-die C, composed of the chains $c$ and $c'$, between which and extending across the base, as in Fig. 3, are a number of rods or rollers $r$. These rods are made of the proper diameter and distance apart to suit the corrugations to be made in the sheet and are preferably hinged loosely to the chain-links $c$ and $c'$, as shown in detail in Fig. 4; but it may in some cases be advantageous to fasten them rigidly to one link at each end of the bars. A weight W having a smooth flat bottom is adapted to slide on the base-plate between the guides $g$ and $g'$.

To operate the device, the flexible chain die C is raised up from the grooved base and may be doubled back, so as to rest upon the weight, as shown in Fig. 1, if desired. A sheet P of the material to be corrugated is laid upon the grooved base, the chain die is brought down onto it, and then the weight W is moved forward over the rollers $r$, forcing them consecutively into the grooves, as shown in Fig. 2, after which the weight is returned to its original position against the stop $s$, and the corrugated sheet is taken out.

It is obvious that this device is especially suitable for corrugating sheets of normally brittle material, which it is necessary to heat in order to render it pliant, for having moved the weight forward to the position shown in Fig. 2 it may be allowed to rest upon the sheet until the latter becomes cool, when it will retain the desired shape of the convolutions and have no tendency to curl up at the ends.

Other modes of applying the principle of my invention may be employed for the mode herein explained. Change may be made as regards the mechanism thus disclosed, provided the principles of construction set forth and claimed by me are employed.

I therefore particularly point out and distinctly claim as my invention—

1. A corrugating-machine consisting of a base provided with suitable grooves, flexible chains each hinged at one end to the base and carrying bars which are adapted to match said grooves, and a weight having a flat bottom fitted to slide over the chain-bars and force them into the grooves, substantially as set forth.

2. The combination in a machine for corrugating sheets, of a base-plate having suitable grooves in its upper face, flexible chains each pivoted at one end to the base, bars connecting the chains and adapted to register with the grooves in the base, and means for forcing said bars consecutively into said grooves and retaining them therein the length of time required, substantially as set forth.

3. In a corrugating-machine, the combination, with a base provided with suitable grooves, of a flexible chain die hinged to the base consisting of rollers linked together at their ends and adapted to register with said grooves, and suitable means for forcing said rollers consecutively into the grooves and retaining them therein during the requisite interval, substantially as set forth.

In testimony whereof I affix my signature, in the presence of two witnesses, at Akron, Ohio, May 8, 1899.

CHARLES TRAXLER.

Witnesses:
  C. B. RAYMOND,
  JOSEPH LANGE.